United States Patent [19]

Tohara

[11] Patent Number: 4,887,268
[45] Date of Patent: Dec. 12, 1989

[54] ERROR CHECKING APPARATUS

[75] Inventor: Hisanori Tohara, Ootawara, Japan

[73] Assignee: Kabushiki Kaisha Toshiba, Kawasaki, Japan

[21] Appl. No.: 137,597

[22] Filed: Dec. 24, 1987

[30] Foreign Application Priority Data

Dec. 27, 1986 [JP] Japan ................................. 61-309058

[51] Int. Cl.$^4$ .............................................. G06F 11/10
[52] U.S. Cl. .................................... 371/40.1; 371/2.1; 371/24
[58] Field of Search ....................... 371/38, 15, 16, 24, 371/2, 21

[56] References Cited

U.S. PATENT DOCUMENTS

| | | | |
|---|---|---|---|
| 4,477,903 | 10/1984 | Schouhamer | 371/38 X |
| 4,483,001 | 11/1984 | Ryan | 371/2 X |
| 4,519,079 | 5/1985 | Hamer | 371/38 |
| 4,564,941 | 1/1986 | Wooley | 371/2 |
| 4,584,682 | 4/1986 | Shah | 371/2 X |
| 4,683,569 | 7/1987 | Rubin | 371/15 X |

Primary Examiner—Jerry Smith
Assistant Examiner—Robert W. Beausoliel
Attorney, Agent, or Firm—Finnegan, Henderson, Farabow, Garrett and Dunner

[57] ABSTRACT

An error checking apparatus includes first and second switching circuits arranged at input and output ports of a data processing circuit for processing data constituted by a plurality of parallel bits to be transferred through a plurality of transmission lines. The first and second switching circuits are switched so as to bit-shift the input/output connections in a normal mode and a test mode. An error detection control circuit is arranged to decide an error position and a cause of an error in accordance with contents of data obtained at the circuit output port before and after switching.

9 Claims, 5 Drawing Sheets

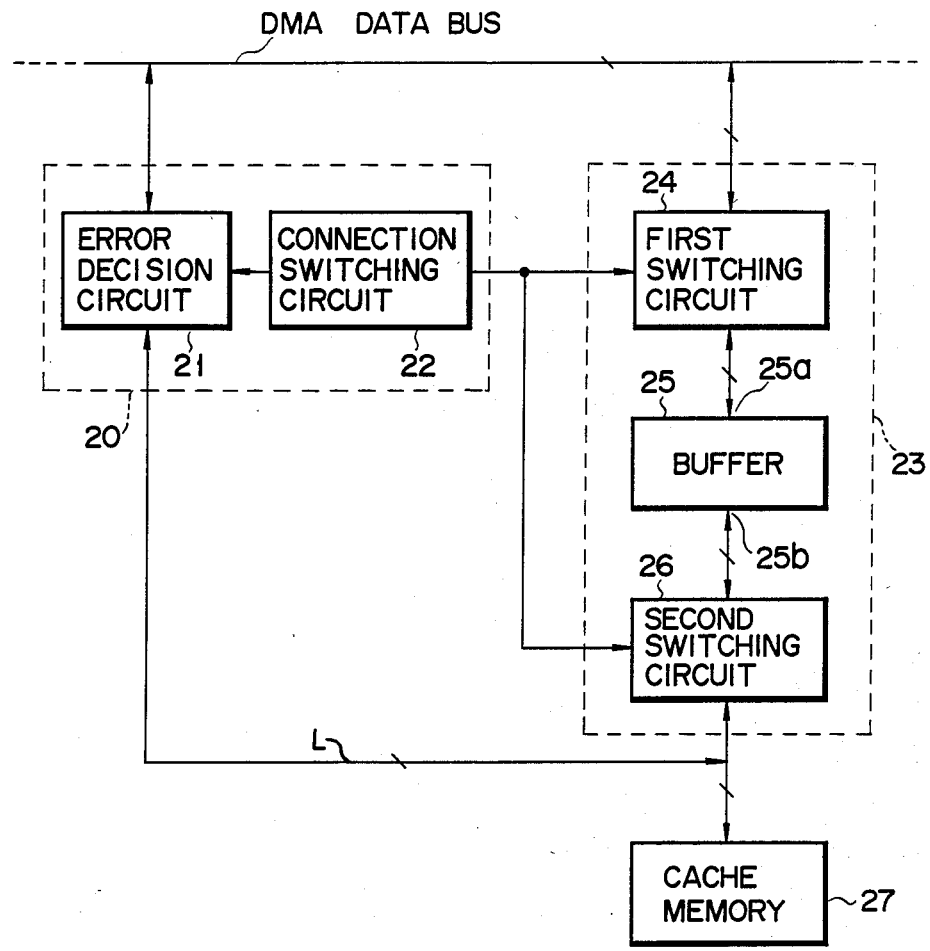
F I G. 1

| CONTROL SIGNAL | NORMAL MODE | TEST MODE |
|---|---|---|
| INPUT | I7 I6 I5 I4 I3 I2 I1 I0 | I7 I6 I5 I4 I3 I2 I1 I0 |
| OUTPUT | O7 O6 O5 O4 O3 O2 O1 O0 | O3 O2 O1 O0 O7 O6 O5 O4 |

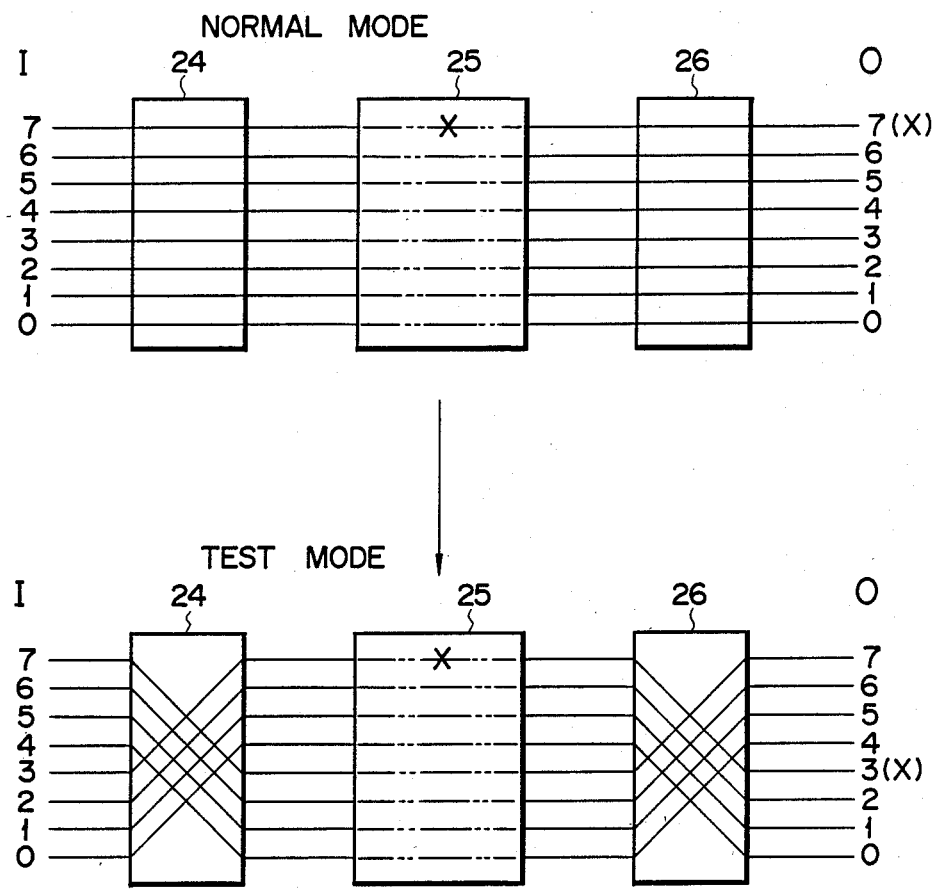
F I G. 5

ERROR CHECKING APPARATUS

BACKGROUND OF THE INVENTION

The present invention relates to an error checking apparatus for checking a data error in a digital data processor.

The number of bits of data to be processed in a digital computer as a digital data processor is increasing due to the development of microprocessor techniques. A system for processing data having 64 bits or more in a DMA memory bus has been developed. Error checking codes such as an error correction code and a parity bit are added to the digital data to be processed in such a system, and the data errors are thus checked.

Data error detection and error correction can be performed by the error checking codes to some extent. According to this scheme, however, it is very difficult to detect the data error position or the cause of the data error.

SUMMARY OF THE INVENTION

It is an object of the present invention to provide an error checking apparatus which can easily detect a data error position and a cause of a data error.

According to the present invention, there is provided an error checking apparatus comprising first switching means, including a plurality of first terminals connected to a plurality of transmission lines for transmitting data and a plurality of second terminals respectively corresponding to the plurality of first terminals, for switching mutual connections between the first and second terminals, second switching means, including first terminals respectively connected to the second terminals of the first switching means through data processing means and second terminals corresponding to the first terminals thereof, for switching mutual connections between the first and second terminals thereof, and means for detecting an error position and a cause of an error in accordance with contents of data obtained before and after switching operations by the first and second switching means.

BRIEF DESCRIPTION OF THE DRAWINGS

FIG. 1 is a block diagram of an error checking apparatus according to an embodiment of the present invention;

FIGS. 5 to 7 are views showing states of the switch before and after switching.

DETAILED DESCRIPTION OF THE PREFERRED EMBODIMENT

Figure 2:
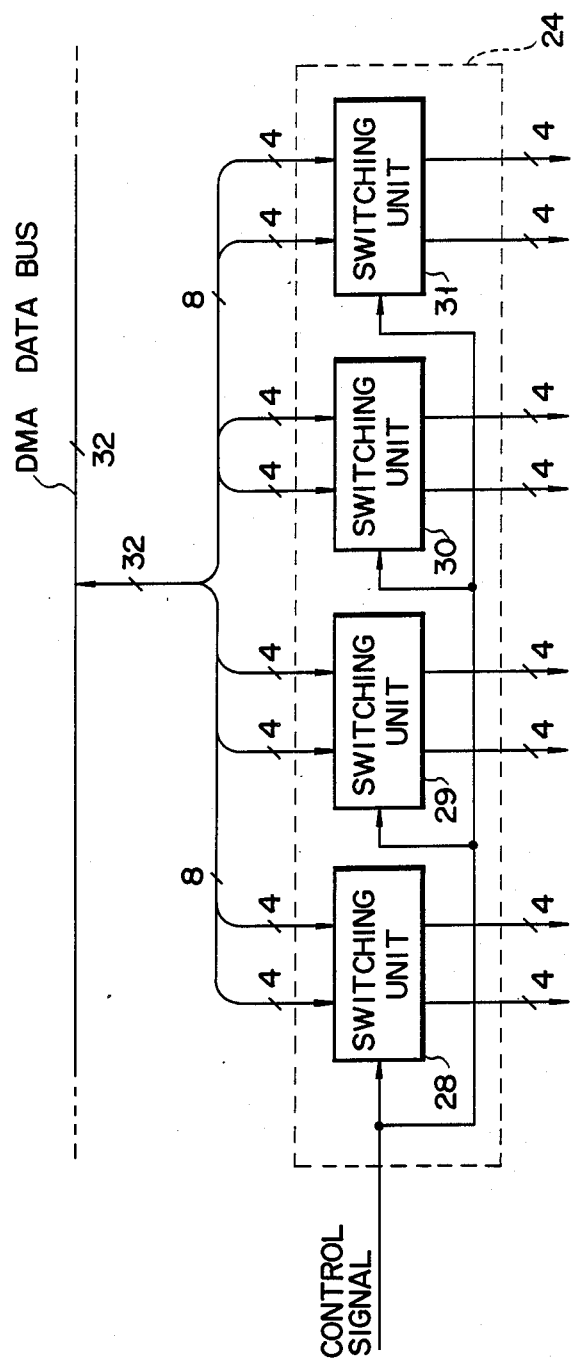
FIG. 2 is a circuit diagram of a first switching circuit shown in FIG. 1.

Referring to FIG. 1, error detection control section 20 and DMA interface 23 are connected to a DMA data bus.

Error detection control section 20 comprises error decision circuit 21 and switching control circuit 22. DMA interface 23 comprises first switching circuit 24 having the first terminal port connected to the DMA data bus, buffer 25 having the first terminal port connected to the second terminal port of first switching circuit 24, and second switching circuit 26 having the first terminal port connected to the second terminal port of buffer 25. The second terminal port of second switching circuit 26 is connected to cache memory 27.

Error decision circuit 21 monitors the states of input and output data before and after line switchings by first and second switching circuits 24 and 26 and decides whether an error has occurred.

Switching control circuit 22 supplies a control signal to switching circuits 24 and 26 so as to switch them. The functions of error decision circuit 21 and switching control circuit 22 can be achieved by using a CPU. The control terminal of switching control circuit 22 is connected to the control terminals of first and second switching circuits 24 and 26.

Each of first and second switching circuits 24 and 26 comprise a plurality of switching units 28, 29, 30, and 31, as shown in FIG. 2. Each of the switching units 28, 29, 30, and 31 comprises a multiplexer or programmable logic device. Each unit has an 8-bit (4 bits+4 bits) structure so that switching circuit 24 or 26 can input and output 32-bit parallel data.

The operation of the error checking circuit will be described below.

Digital data is transferred from the DMA data bus to cache memory 27 through first switching circuit 24, buffer 25, and second switching circuit 26. The digital data in cache memory 27 is transferred onto the DMA data bus through second switching circuit 26, buffer 25, and first switching circuit 24.

In order to check a data error, first and second switching circuits 24 and 26 are switched in accordance with a control signal output from switching control circuit 22. Error decision circuit 21 decides the presence/absence of an error from the data status before and after switching.

Figures 3, 4:
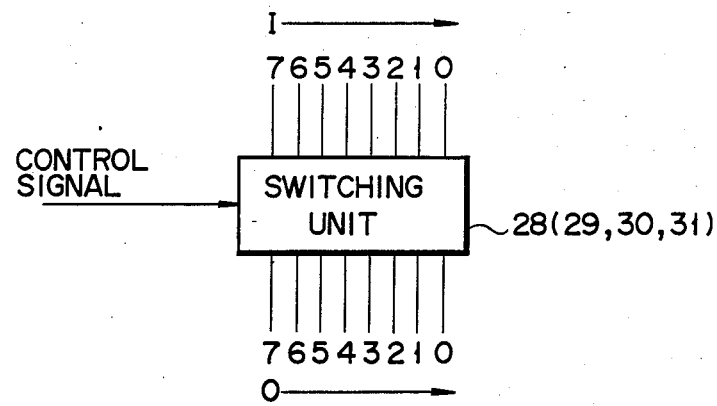
FIG. 3 is a view showing a switching unit shown in FIG. 2.
FIG. 4 is a chart showing data at input and output terminals of the switching unit shown in FIG. 3.

FIG. 3 shows one switching unit, e.g., switching unit 28. Switching unit 28 has an 8-bit input and an 8-bit output. FIG. 4 shows the relationship between the input and the output of the switching unit in a normal mode (before switching) and a test mode (after switching). Referring to FIG. 4, in the normal mode, the eight input bits (I7, I6, I5, I4, I3, I2, I1, I0) appear as eight output bits (O7, O6, O5, O4, O3, O2, O1, O0) having the same order as that of the eight input bits in the switching unit. However, in the test mode, the upper four bits (I7, I6, I5, I4) and the lower four bits (I3, I2, I1, I0) of the eight input bits (I7, I6, I5, I4, I3, I2, I1, I0) are reordered and appear as eight output bits (O3, O2, O1, O0, O7, O6, O5, O4). The input and output orders are switched in the test mode in other switching units 29, 30, and 31 in the same manner as in switching unit 28.

Input/output switching is performed in second switching circuit 26 in the same manner as in first switching circuit 24.

In the circuit shown in FIG. 1, assume that a data error occurs when the data transfer is performed between the DMA data bus and cache memory 27 through buffer 25 in the state where first and second switching circuits 24 and 26 are set at the normal mode. In this case, this error appears at the output port of buffer 25. This error can be detected by a parity check or the like. In this stage, however, whether or not the error occurred in buffer 25 cannot be detected.

One switching unit will be taken into consideration, as shown in FIG. 5. In the normal mode, an error caused by crosstalk, reflection, IC failure or the like occurs at a position (indicated by x), corresponding to bit 7 in buffer 25. This error appears as error bit (7), i.e., O7 of the output from switching circuit 26. It cannot be discriminated whether the error has occurred inside or outside buffer 25. In other words, even if an error occurs at the input side [I(7)] of switching circuit 24, the error bit appears in output O(7). In this case, switching circuits 24 and 26 are switched into the check mode by the control signal from switching control circuit 22. The upper four bits and the lower four bits are reordered in each of switching circuits 24 and 26, as shown in FIG. 5, thereby setting the test mode. The error bit appearing in output O is shifted from O7 to O3. However, if the error occurs outside buffer 25, e.g., if an error occurs in input bit I(7) the error bit appears at output O(7) and the error bit is not shifted. Error bit shifting is detected when switching circuits 24 and 26 switch into the test mode to detect whether the error occurs inside or outside buffer 25. This error decision can be performed by error decision circuit 21 on the basis of the data input through the DMA data bus and line L as shown in FIG. 1.

The error position can be detected by checking the data states in the normal mode (before switching) and in the test mode (after switching). In particular, if an error occurs in a black box (buffer 25 in this embodiment), error checking is performed on the basis of data which appears on the input and output ports of the data bus and line L so that, even in a complicated system using a plurality of block boxes, the error position and the cause of the error can be accurately detected by providing a plurality of sets of first and second switching circuits.

Figure 6:
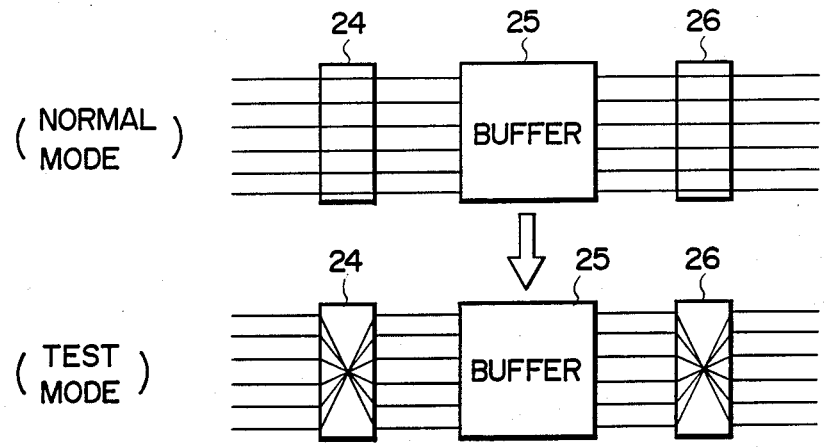

In the above embodiment, bit shifting is performed between a plurality of bit groups, e.g., four bit groups each constituting 8 bits. In other words, a block inverse method is employed. However, as shown in FIG. 6, another bit inverse method may be employed such that all bits are inversed. More specifically, input bit 31 to input bit 0 of switching circuit 24 are inversed into output bit O to output bit 31. Similarly, input bit 0 to input bit 31 of switching circuit 26 are inversed into output bit 31 to output bit 0.

Figure 7:
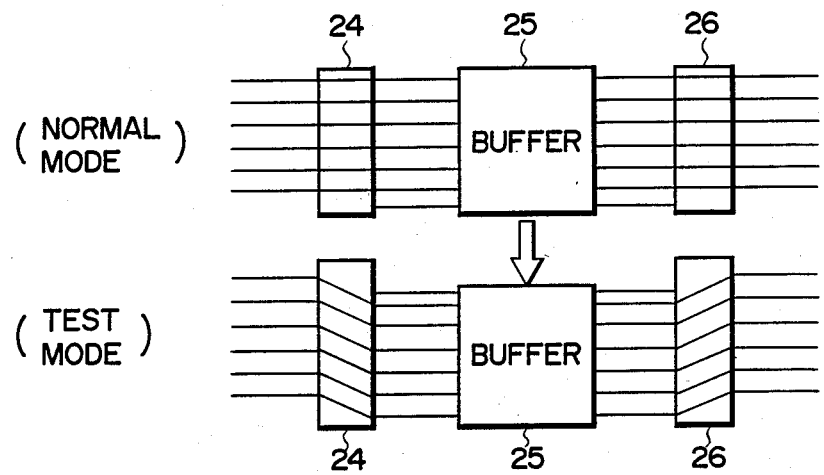

The DMA interface may be arranged as shown in FIG. 7. Referring to FIG. 7, empty bits (auxiliary bits) are respectively arranged in switching circuits 24 and 26 and buffer 25. In this case, the DMA interface shifts all the bits by one bit in the test mode. This checking scheme is called an auxiliary bit method. According to this method, when a one-bit error occurs in buffer 25, the auxiliary bit in buffer 25 can be used in place of the error bit and repairing can thus be easily performed. That is, the circuit shown in FIG. 7 operates in the normal mode, with bits including the auxiliary bit.

In the above embodiment, first and second switching circuits 24 and 26 are automatically switched by switching control circuit 22. However, these switching circuits may be manually switched. In this case, an IC socket or the like is arranged in DMA interface 23, and a normal mode IC and a test mode IC (line-switched) are also prepared. In the normal operation, the normal mode IC is attached to the socket. In the test mode, the test mode IC is attached to the socket.

What is claimed is:
1. An error checking apparatus comprising:
   interface means for interfacing data having a plurality of bits;
   first switching means, including a plurality of first terminals connected to a plurality of transmission lines for transmitting data, and a plurality of second terminals respectively corresponding to said plurality of first terminals, for switching mutual connections between said first and second terminals;
   second switching means, including a plurality of first terminals respectively connected to said second terminals of said first switching means through said interface means, and a plurality of second terminals corresponding to said first terminals thereof, for switching mutual connections between said first and second terminals thereof; and
   means for detecting data obtained from said first and second switching means before and after said first and second switching means are switched to determine an error position and a cause of an error in accordance with the data.

2. An apparatus according to claim 1, wherein each of said first and second switching means comprises means for switching a plurality of groups of said first terminals and said second terminals, which correspond to said plurality of bits constituting the data.

3. An apparatus according to claim 1, wherein each of said first and second switching means comprises means for switching said first and second terminals respectively, corresponding to the plurality of bits constituting the data in such a manner that a relationship between an input and an output is inversed.

4. An apparatus according to claim 1, wherein said interface means comprises an auxiliary interfacing system corresponding to at least one bit, and each of said first and second switching means comprises means for switching said first and second terminals so as to shift at least one bit to the auxiliary interfacing system.

5. An apparatus according to claim 4, herein said interface means is normally operated, using the auxiliary interfacing system in place of a processing system including an error.

6. An apparatus according to claim 1, wherein each of said first and second switching means comprises a multiplexer.

7. An apparatus according to claim 1, wherein each of said first and second switching means comprises a programmable logic device.

8. An error checking apparatus comprising:
   interface means for interfacing data having a plurality of bits;
   first switching means, including a plurality of first terminals connected to a plurality of transmission lines for transmitting data, and a plurality of second terminals respectively corresponding to said plurality of first terminals, for switching mutual connections between said first and second terminals;
   second switching means, including a plurality of first terminals respectively connected to said second terminals of said first switching means through said interface means, and a plurality of second terminals corresponding to said first terminals thereof, for switching mutual connections between said first and second terminals thereof; and
   means for detecting the difference between data obtained from said first and second switching means before said first and second switching means are switched, and data obtained from said first and second switching means after said first and second switching means are switched, to determine an error position and a cause of an error in accordance with the difference.

9. An error checking apparatus according to claim 8, wherein said bits include an error bit, and said detecting means comprises means for detecting the error bit appearing at said second terminals of said second switching means before and after said first and second switching means are switched, and for determining the error position and the cause of error from the position of the error bit at said second terminals.

* * * * *

UNITED STATES PATENT AND TRADEMARK OFFICE
CERTIFICATE OF CORRECTION

PATENT NO. : 4,887,268

DATED : December 12, 1989

INVENTOR(S) : Hisanori Tohara

It is certified that error appears in the above-identified patent and that said Letters Patent is hereby corrected as shown below:

Claim 5, Column 4, Line 28, change "herein" to --wherein--.

Signed and Sealed this

Second Day of June, 1992

Attest:

DOUGLAS B. COMER

*Attesting Officer*     Acting Commissioner of Patents and Trademarks